United States Patent
Engeli et al.

(10) Patent No.: US 9,118,971 B2
(45) Date of Patent: Aug. 25, 2015

(54) METHOD AND APPARATUS FOR AUTOMATIC RECORDING ACCORDING TO USER PREFERENCES

(75) Inventors: Severin Werner Engeli, Herisau (CH); Roger Dominik Bozzini, Schaffhaussen (CH)

(73) Assignee: Thomson Licensing, Issy les Moulineaux (FR)

(*) Notice: Subject to any disclaimer, the term of this patent is extended or adjusted under 35 U.S.C. 154(b) by 0 days.

(21) Appl. No.: 14/127,985

(22) PCT Filed: Jun. 30, 2011

(86) PCT No.: PCT/IB2011/001540
§ 371 (c)(1),
(2), (4) Date: Dec. 20, 2013

(87) PCT Pub. No.: WO2013/001328
PCT Pub. Date: Jan. 3, 2013

(65) Prior Publication Data
US 2014/0126890 A1 May 8, 2014

(51) Int. Cl.
*H04N 5/761* (2006.01)
*H04N 21/482* (2011.01)
*H04N 21/4147* (2011.01)
*H04N 21/433* (2011.01)
*H04N 21/458* (2011.01)
*H04N 21/466* (2011.01)
(Continued)

(52) U.S. Cl.
CPC ........ *H04N 21/4828* (2013.01); *H04N 21/4147* (2013.01); *H04N 21/4334* (2013.01); *H04N 21/4583* (2013.01); *H04N 21/4668* (2013.01); *H04N 21/4755* (2013.01); *H04N 21/47214* (2013.01)

(58) Field of Classification Search
CPC ................... H04N 21/4668; H04N 21/47214; H04N 21/4755
USPC ........................................................ 386/296
See application file for complete search history.

(56) References Cited

U.S. PATENT DOCUMENTS 6,324,338 B1   11/2001   Wood et al.
6,614,987 B1   9/2003   Ismail et al.
(Continued)

FOREIGN PATENT DOCUMENTS

EP   1331814   6/2008
EP   2068558   6/2009
(Continued)

OTHER PUBLICATIONS

International Search Report Dated Mar. 11, 2013.

*Primary Examiner* — William Tran
(74) *Attorney, Agent, or Firm* — Robert D. Shedd; Reitseng Lin

(57) ABSTRACT

A method and apparatus searches a program for automatic recording according to user preferences, which include entries entered by a user and entries automatically added by the apparatus according to a recording habit of the user. A user can assign a priority to a user entered entry and the apparatus can assign a priority to an automatically entered entry, but the priority of an automatically entered entry can be modified by the user. The apparatus searches program information of programs in an electronic program guide having a match to any of the entries and selects a matched program for automatic recording.

26 Claims, 12 Drawing Sheets

(51) Int. Cl.
*H04N 21/472* (2011.01)
*H04N 21/475* (2011.01)

(56) References Cited

U.S. PATENT DOCUMENTS

| | | | |
|---|---|---|---|
| 6,728,713 B1 * | 4/2004 | Beach et al. | 1/1 |
| 6,898,762 B2 | 5/2005 | Ellis et al. | |
| 6,973,663 B1 | 12/2005 | Brown et al. | |
| 7,096,486 B1 | 8/2006 | Ukai et al. | |
| 7,185,355 B1 | 2/2007 | Ellis et al. | |
| 7,343,085 B2 | 3/2008 | Hasegawa | |
| 7,581,237 B1 | 8/2009 | Kurapati | |
| 2001/0019658 A1 | 9/2001 | Barton et al. | |
| 2003/0020744 A1 | 1/2003 | Ellis et al. | |
| 2003/0226145 A1 | 12/2003 | Marsh | |
| 2004/0073918 A1 | 4/2004 | Ferman et al. | |
| 2005/0289599 A1 * | 12/2005 | Matsuura et al. | 725/53 |
| 2007/0079333 A1 | 4/2007 | Murakami et al. | |
| 2007/0271582 A1 | 11/2007 | Ellis et al. | |
| 2009/0142035 A1 * | 6/2009 | Kummer et al. | 386/83 |
| 2010/0008637 A1 * | 1/2010 | Yoshimura et al. | 386/46 |
| 2010/0030771 A1 | 2/2010 | Takagi | |

FOREIGN PATENT DOCUMENTS

| | | |
|---|---|---|
| JP | 2000013708 | 1/2000 |
| JP | 2002112132 | 4/2002 |
| JP | 2002530969 | 9/2002 |
| JP | 2003289481 | 10/2003 |
| JP | 2004513577 | 4/2004 |
| JP | 2004297605 | 10/2004 |
| JP | 2005348071 | 12/2005 |
| JP | 2006005541 | 1/2006 |
| JP | 2006516078 | 6/2006 |
| JP | 2006423777 | 11/2006 |
| JP | 2007104312 | 4/2007 |
| JP | 2008278400 | 11/2008 |
| JP | 2008306278 | 12/2008 |
| JP | 2010206305 | 9/2010 |
| WO | WO99/45701 | 9/1999 |
| WO | WO2005101817 | 10/2005 |

* cited by examiner

Keyword-Hits 1120
Thriller, John Smith

Not on Keywords-List 1110
Andy Brown, Kamenka, Mike Jones, Movie, Natasha Williams, PG-13, Police, Roberto M. Alfredo

Removed by Dictionary 1101
5, 15, 20, 22, 25, 27, 110, 2001, 2009, a, actors, alive, and, by, city, date, description, directed, duration, for, found, genre, had, in, last, min, no, of, on, rating, small, so, south, start, station, stop, the, time, town, was, west, written

| 1210 | Keywords User-List (weighing = high) | Hit? | Priority-Factor | |
|---|---|---|---|---|
| | 1. Thriller | YES | 7x | = 7 |
| | 2. Drama | NO | 6x | = 0 |
| | 3. John Smith | YES | 5x | = 5 |
| | 4. Bill Johnson | NO | 4x | = 0 |
| | 5. Wildlife | NO | 3x | = 0 |
| | 6. Soccer | NO | 2x | = 0 |
| | 7. Historical | NO | 1x | = 0 |
| | | Totals: | 28 | 12 |

Normalized Value: 12/28 = 0.43

(b)

| 1240 | Channels User-List (weighing = medium) | Hit? | Priority-Factor | |
|---|---|---|---|---|
| | 1. Discovery | NO | 5x | = 0 |
| | 2. Movie Channel | YES | 4x | = 4 |
| | 3. ABC | NO | 3x | = 0 |
| | 4. BBC Int. | NO | 2x | = 0 |
| | 5. Nat Geo Wild | NO | 1x | = 0 |
| | | Totals: | 15 | 4 |

Normalized Value: 4/15 = 0.27

(c)

| 1270 | Genre User-List (weighing = low) | Hit? | Priority-Factor | |
|---|---|---|---|---|
| | 1. Documentary | NO | 4x | = 0 |
| | 2. Thriller | YES | 3x | = 3 |
| | 3. Action | NO | 2x | = 0 |
| | 4. Sci-Fi | NO | 1x | = 0 |
| | | Totals: | 10 | 3 |

Normalized Value: 3/10 = 0.30

FIG. 12

| List Weighing | Carry | Weighing Factor | Weighted Result |
|---|---|---|---|
| Keyword List | 0.43 | x5 | 2.15 |
| Channel List | 0.27 | x3 | 0.81 |
| Genre List | 0.30 | x1 | 0.30 |
| Totals: | | 9 | 3.26 |

Normalized Value (3.26/9) = 0.36
Threshold = 0.25

Decision: Result > Threshold = Selected for Recording!

FIG. 13

METHOD AND APPARATUS FOR AUTOMATIC RECORDING ACCORDING TO USER PREFERENCES

BACKGROUND OF THE INVENTION

1. Field of the Invention

This application claims the benefit, under U.S.C. §365 of International Application PCT/IB2011/001540, filed Jun. 30, 2011 which was published in accordance with PCT Article 21(2) on Jan. 3, 2013 in English. This application is related to PCT application PCT/IB2011/001530.

2. Background Information

Currently, recording of television programs by individuals for viewing at a later time is generally performed using commercially available Video Cassette Recorders (VCRs). Typically, a VCR may be either manually placed into a record mode or may be programmed to record a selected program at a later time. To program the VCR, the user either enters a date, time and channel of the program desired to be recorded, or enters an identification code of the desired program. Recording to a personal video recorder (PVR), a hard disk recorder (HDR), or a digital video recorder (DVR) is similar.

Viewers of television programming increasingly have more choices as to which programs to view. For example, cable television provides a dramatic increase in the number of channels available to a viewer in comparison to the channels available by way of a conventional television antenna. Digital satellite systems provide even more viewing choices. Digital broadcast of programs over cable television systems is expected to further increase the number of channels available to viewers.

One effect of the increase in the number of viewing choices is increased difficulty in deciding which programs to watch. People, particularly those with busy schedules, may not have the time to select and view programs to determine which programs they may or may not like. Programs that may otherwise be desirable to a viewer may never be watched if the program is broadcast at a time that is inconvenient for the viewer. Users may select certain programs for viewing to determine if they like the program. However, with several hundred program selections each week, this task can take a considerable amount of time and is likely to cause certain desirable programs to be overlooked.

Accordingly, it would therefore be desirable to have a system that automatically determines which programs to record based on user to preferences. Ideally, appropriate programs matching the user's preferences could then be recorded, thus relieving the user from the task of selecting programs to record from among potentially hundreds of program selections.

SUMMARY OF THE INVENTION

A method and apparatus in accordance with various implementations of the present principles address the deficiencies of the prior art by automatically selecting programs for automatic recording according to both user entered parameters and automatically generated parameters according to user's recording habit. According to one aspect of the present principles, a method for searching a program for automatic recording is disclosed. According to an exemplary embodiment, the method comprises steps of enabling input of a first entry and an associated first priority from a user, wherein the first entry is one of following categories: keyword, channel, and genre; automatically entering, by a television receiver, a second entry in the one category according to a recording habit of the user; automatically assigning, by the television receiver, a second priority to the second entry; and searching program information of programs in an electronic program guide having a match on one of the first and second entries.

The method may further comprise the step of selecting a matched program for automatic recording.

The method may further comprise steps of enabling input of entries to an exclusion list; if the matched program having program information includes any one of the entries in the exclusion list, the selecting step does not select the matched program.

The method may further comprise a step of computing a final score according to the first and second priorities for each matched program. The computing step may include assigning first and second numbers according to the first and second priorities, respectively; assigning first and second scores as the first and second numbers if there is match to the first and second keywords, respectively, and as zero if no match to the first and second keywords, respectively; and combining the first and second scores to produce the final score. The combining step may include adding the first and second numbers to form a third number; adding the first and second scores to form a fourth number; and dividing the fourth number by the third number to form the final score.

The method may further comprise a step of enabling selection of signal sources for automatic recording, wherein the selecting step selects matched programs only from one of the signal sources. The method may further comprises a step of enabling selection of storage devices and recording a matched program to one of the storage devices and/or a step of marking the second keyword indicating that the second entry is entered by the television receiver.

In another exemplary embodiment, an apparatus is disclosed. The apparatus comprises an input receiving a first entry and associated first priority from a user, wherein the first entry is one of following categories: keyword, channel, and genre; a processor entering a second entry in the one category according to a recording habit of the user, automatically assigning a second priority to the second entry; and receiving the first entry and the first priority from the input; a memory storing an electronic program guide, and the first and second entries and priorities, wherein the processor stores the first and second entries and priorities into the memory, searches program information of programs in the electronic program guide having a match on one of the first and second entries and selects a matched program for automatic recording.

The processor may receive from the input entries to an exclusion list, and if the matched program having program information includes any one of the entries in the exclusion list, the processor does not select the matched program.

The processor may compute a final score according to the first and second priorities by assigning first and second numbers according to the first and second priorities, respectively, assigning first and second scores as the first and second numbers if there is match to the first and second entries, respectively, and as zero if no match to the first and second entries, respectively, and combining the first and second scores to produce the final score.

The processor may combine the first and second scores to produce the final score by adding the first and second numbers to form a third number, adding the first and second scores to form a fourth number, dividing the fourth number by the third number to form the final score.

The processor may receive selection of a signal source and selects matched programs only from the signal source and/or selection of a storage device and records a matched program only to the storage device.

A user may change the first and second priorities. The first priority may differ from the second priority. If the final score of a matched program is greater than a threshold, the matched program is selected for automatic recording. The threshold may be entered by the user.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 11 shows words in the program information of FIG. 10 not considered by the apparatus, keywords in the program information of FIG. 10 that are in a keyword list and keywords not in a keyword list;

FIG. 12 shows how score for each category in the example of FIG. 10 is computed according to an embodiment of the present invention; and FIG. 13 shows a how a final score is computed according to the category scores according to an embodiment of the present invention.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
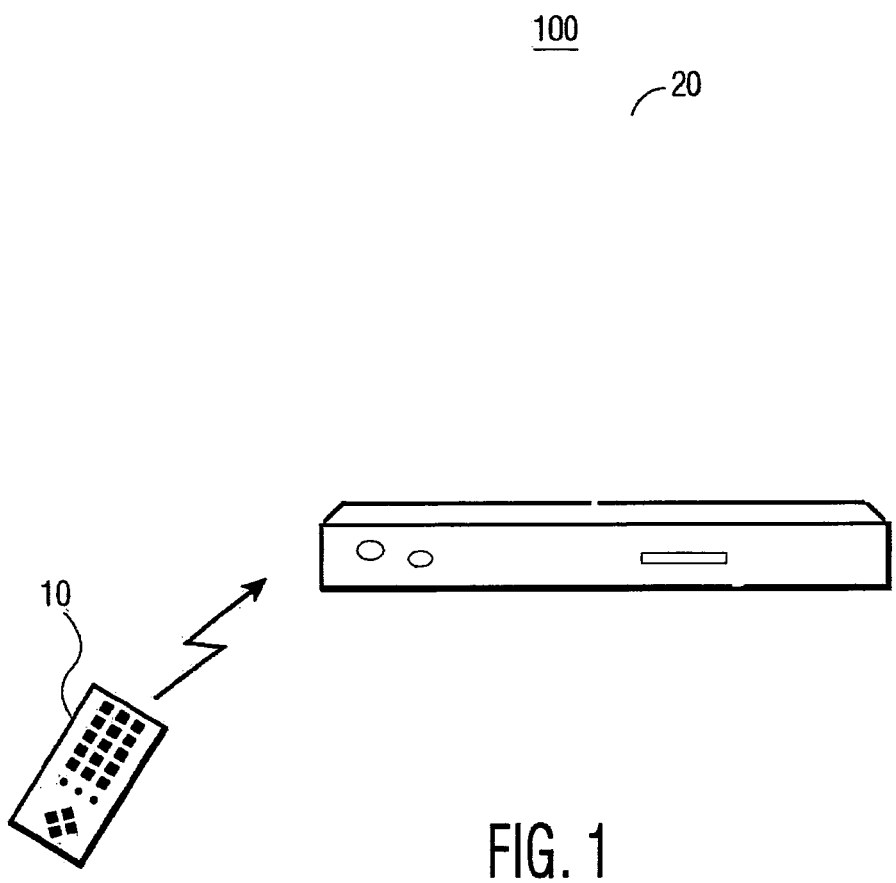
FIG. 1 shows an apparatus according to an exemplary embodiment of the present invention.

Referring now to the drawings, and more particularly to FIG. 1, an exemplary environment 100 suitable for implementing the present invention is shown. As indicated in FIG. 1, environment 100 comprises a user input device 10, and an apparatus 20 capable of providing set-up menus for a user to enter preference data and automatic recording according to the preferences. According to an exemplary embodiment, apparatus 20 is embodied as a television signal receiver (e.g., set-top box, VCR, PVR, HDR, DVR, etc.) without an integrated display device, but may be embodied as an apparatus or device that includes an integrated display device. Apparatus 20 may also be embodied as an audio device such as a radio or a radio recorder.

User input device 10 is operative to generate and output control signals that control the operation of apparatus 20 and/or other devices. According to an exemplary embodiment, user input device 10 includes a plurality of input keys and outputs control signals in a wired and/or wireless (e.g., via infrared or radio frequency (RF) link, etc.) manner responsive to user depression of its input keys. User input device 10 may for example be embodied as a hand-held remote control device, wired and/or wireless keyboard, integrated control panel of apparatus 20, and/or other user input device.

Apparatus 20 is operative to receive signals including audio, video and/or data signals having one or more types of analog modulation (e.g., NTSC, PAL, SECAM, etc.) and one or more types of digital modulation (e.g., QPSK, QAM, VSB, etc.) from one or more signal sources such as cable, terrestrial, satellite, internet and/or other signal sources and to provide aural and/or visual outputs corresponding to these received signals. Apparatus 20 is operative to allow instant, time-shift and timer recordings. Time-shift recording is a system that is used temporarily to store broadcast signals for later viewing, instant recording is a system for immediate recording and timer recording is a system that is used for predefined, later recording of media content. In addition, apparatus 20 provides automatic recording according to user's preferences according to the principles of the invention.

Apparatus 20 is also operative to process received signals and provide the resulting processed signals to one or more other devices, and to receive signals from other devices.

Apparatus 20 is further operative to provide on-screen set-up menus for users to set user preferences in accordance with the principles of the present invention. The set-up menus can be invoked during installation of apparatus 20 or invoked by a user at any time in normal operation of apparatus 20. According to an exemplary embodiment, apparatus 20 collects user preference data for recording, such as keywords and associated priorities, channel names (representing channels) and associated priorities; genres and associated priorities; program lengths; priorities among instant time-shift, and timer recordings; priorities between two recordings overlapping in time; new search and new data calculation intervals; actions to be taken when the system is running out of memory; keywords, channels, and genres that should not be considered in a search; signal sources for use in automatic recording; storage devices for use in automatic recording; and whether an adaptive mode for apparatus 20 to collect user settings according to the recording habit of a user is allowed.

When an adaptive mode is enabled, apparatus 20 is also operative to automatically monitor a recording habit of a user and generate user preference data according to the user's recording habit. For example, apparatus 20 generates keywords from program information of those programs frequently watched by the user, and use those automatically generated data and/or user entered data to select programs for recording.

Apparatus 20 is also operative to score a program in an electronic program guide (EPG) according to the priorities of keywords, channels, and genres matched to program information of that program in the EPG. When the score of a program exceeds a recording score threshold, apparatus 20 selects that program for automatic recording.

Figure 2:
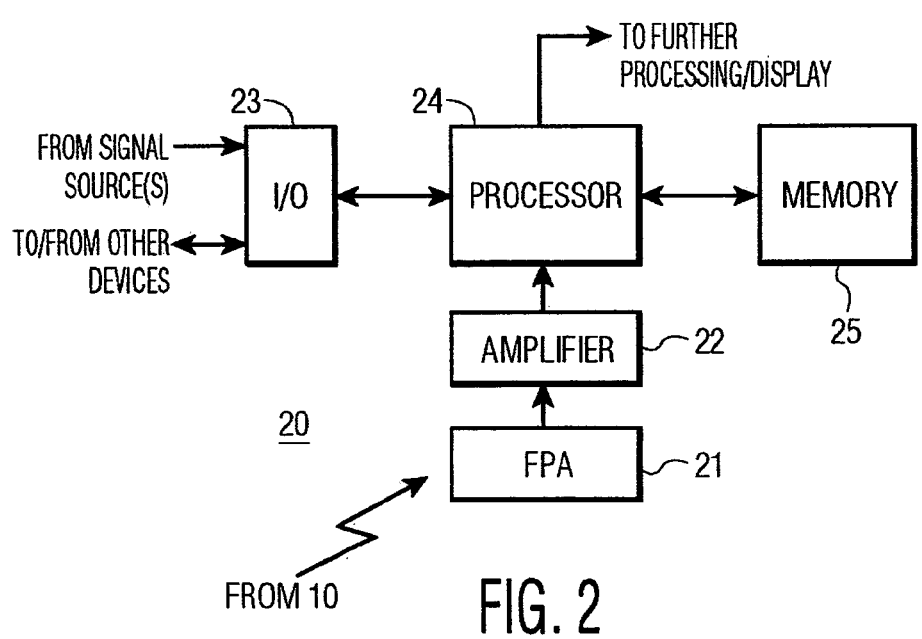
FIG. 2 shows a block diagram of the apparatus of FIG. 1 according to an exemplary embodiment of the present invention.

Referring to FIG. 2, a diagram providing further details of apparatus 20 of FIG. 1 according to an exemplary embodiment of the present invention is shown. Apparatus 20 of FIG. 2 comprises front panel means such as front panel assembly (FPA) 21, amplifying means such as amplifier 22, and input/output (I/O) means such as I/O block 23, processing means such as processor 24, and memory means such as memory 25. Some of the foregoing elements of FIG. 2 may be embodied using integrated circuits (ICs), and some elements may for example be included on one or more ICs. For clarity of description, certain conventional elements associated with apparatus 20 such as certain control signals, power signals and/or other elements may not be shown in FIG. 2.

FPA 21 is operative to receive user inputs from user input device 10, and to output signals corresponding to the user inputs to amplifier 22. According to an exemplary embodiment, FPA 21 receives signals, such as IR and/or RF signals, from user input device 10 and generates corresponding signals which are output to amplifier 22. Amplifier 22 is operative to amplify the signals provided from FPA 21 for output to processor 24.

I/O block 23 is operative to perform I/O functions of apparatus 20. According to an exemplary embodiment, I/O block 23 is operative to receive signals such as audio, video and/or data signals in analog and digital modulation formats from one or more signal sources such as cable, terrestrial, satellite, Internet and/or other signal sources. Although not expressly shown in FIG. 2, I/O block 23 may include a plurality of input terminals each designated to receive signals from a given signal source. For example, I/O block 23 may include separate input terminals for receiving signals from cable, antenna (i.e., terrestrial), satellite, internet and/or other signal sources. I/O block 23 is also operative to output processed signals to one or more other devices, and to receive signals from such devices.

Processor 24 is operative to perform various signal processing and control functions of apparatus 20. According to an exemplary embodiment, processor 24 processes the audio, video and/or data signals provided from to I/O block 23 by performing functions including channel tuning, analog and digital demodulation, and other functions to thereby generate data representing audio, video and/or data content. The data produced from such processing functions may be provided for further processing (e.g., MPEG decoding, etc.) and output. Also according to an exemplary embodiment, processor 24 detects and processes user inputs provided via user input device 10, and may control its own operations and/or output control signals to control other elements of apparatus 20 (including elements not shown in FIG. 2) responsive to such user inputs.

Processor 24 is also operative to execute software code that automatically monitors user's recording habit and automatically collects preference data from information of programs watched and/or recorded/replayed by the user, enables display of set-up menus for a user to enter preference data, and automatically selects programs for recording according to user preference data in accordance with principles of the present invention. According to an exemplary embodiment, processor 24 causes user preference data to be collected in memory 25. According to this exemplary embodiment, processor 24 compares user preference data with program information of a program included in an EPG and calculates a match score for that program. If the match score of a program exceeds a recording score threshold, processor 24 selects that program for automatic recording. Processor 24 is also operative to perform and/or enable other functions of apparatus 20 including, but not limited to, detecting inputs to apparatus 20, reading and writing data from and to memory 25, and/or other functions.

Memory 25 is operative to perform data storage functions of apparatus 20. According to an exemplary embodiment, memory 25 stores data including, but not limited to, software code, electronic program guide data, user preference data, and/or other data. Memory 25 may include volatile and/or non-volatile memory regions and storage devices such hard disk drives, DVD drives.

Figure 3:
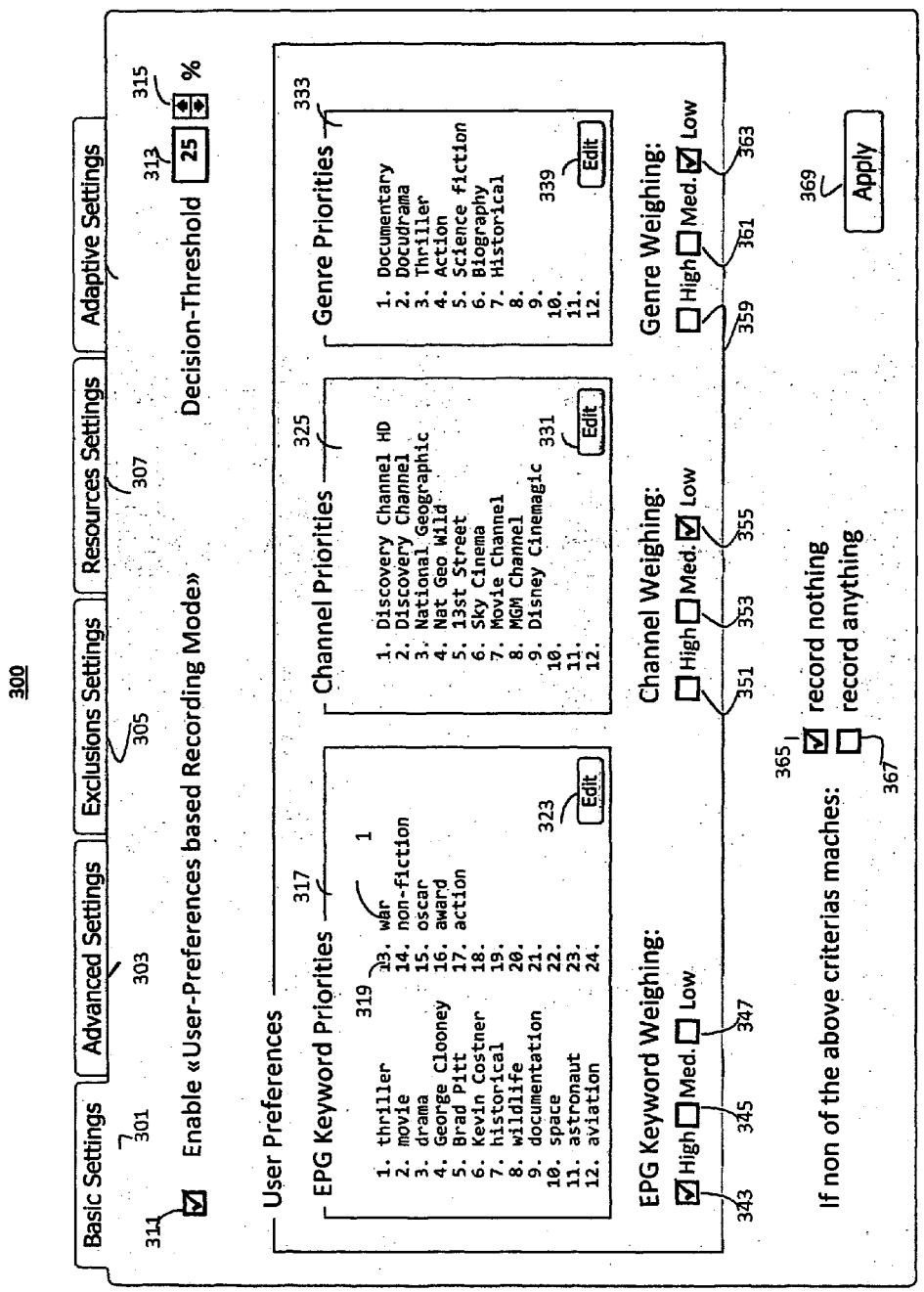
FIG. 3 shows an exemplary set-up menu for a user to enter keywords, channel names, and genres and associated priorities according to an exemplary embodiment of the present invention.

Referring to now FIG. 3, an exemplary set-up menu 300 for a user to enter keywords, channel names, genres and associated priorities is shown. The set-up menu 300 can be presented as a graphical user interface (GUI). The menu 300 includes five menu bars on the top: Basic Setting 301, Advance Settings 303, Exclusions Settings 305, Resources Settings 307, and Adaptive Settings 309. In FIG. 3, Basic Setting 301 is selected by a user and the menu 300 displays the preference parameters that the user can set under Basic Setting 301.

The check box 311 allows a user to select whether the user wants to enable the user-preferences based recording mode. The check box 311 must be checked if the user desires apparatus 20 to automatically record programs according to the user preferences. If the check box 311 is not checked, the apparatus 20 will not automatically record programs according the user preferences. When the user has checked the box 311, the user should also enter a decision threshold (the recording score threshold) at a number box 313. In the embodiment, the unit of the threshold is in percentage (%) and is ranging from 0 to 100%. The default in this example is set at 25%. The user can increase or decrease the threshold by using the up and down arrows 315 according to a conventional menu design.

Under Basic Settings 301, the parameters with priorities are classified in three categories: electronic program guide (EPG) keywords, channel name, and genres. They are respectively listed in a keyword list 317 under EPG Keyword Priorities, a channel name list 325 under Channel Priorities, and a genre list 333 under Genre Priorities. A keyword, such as keyword 321 "war" listed with a priority 319 of 13, can be entered by activating an Edit button 323. In this example, the position of a keyword in the keyword list represents its priority. For example, the keyword "thriller" has the highest priority because it is listed in the first position, while the keyword "action" has the lowest priority because the keyword "action" is listed in the last position in the keyword list. In an alternative, a keyword lists earlier may considered having a lower priority. In yet another alternative, all keywords in the keyword list 317 may have the same priority. A user interface (not shown) should be provided for a user to select a desired priority scheme. The items in the channel name to list 325 and genre list 333 are treated in a similar manner.

When the Edit button 323 is activated, a pop-up menu (not shown) should list all the existing keywords in their present order and provide a text box for a user to enter another keyword. The pop-menu may provide a virtual keyboard for the user to enter a new keyword. The newly entered keyword is listed at the end of the number list. However, the user can change the list position of a keyword by placing it, for example dragging it, to a desired position in the number list.

The pop-up menu can also provide the user a delete button, so that the user can select, for example by highlighting, a keyword and activate the delete button to delete the selected keyword. When a keyword is deleted, the list is renumbered, so that there is no empty slot in the number list. For example, if the keyword "war" listed as the number 13 item is deleted, the keyword "non-fiction" will become the number 13 item, and the numbers of the higher number items will be reduced by one in a similar manner.

The user may assign a weighing factor for the EPG keyword category by checking one of a High box 343 for high, a Med box 345 for medium, and a Low box 347 for low. As will be explained later, the weighing factor affects the weight of the keyword category in computing a final match score for a program. The final match score, in this example, is expressed in percentage and the final score must exceed the recording score threshold entered at the box 313, in order for a program to be automatically recorded.

The channel user preferences listed in the channel name list 325 under Channel Priorities 325 are entered, deleted, and arranged in a similar manner using an Edit button 331 as the EPG keywords are handled in the keyword list 317, described above. The priority schemes for items listed in the channel name list 325 are similar to that of the keyword list 317. Similar to the keyword category, a user can assign a channel weighing factor using check boxes 351, 353, and 355.

The genre user preferences listed the genre list 333 under Genre Priorities are entered, deleted, and arranged in a similar manner using an Edit button 339 as the EPG keywords are handled in the keyword list 317, described above. The priority schemes for items listed in the genre list 333 are similar to that of the keyword list 317. Similar to the keyword category, a user can assign a genre weighing factor using check boxes 359, 361, and 363.

At the bottom of the menu 300, a user is given a choice in the case that no program meets the criterion for automatic recording. A user may check a check box 365 asking apparatus 20 to record nothing or a check box 367 asking apparatus 20 to record anything. The default in this example is to record nothing.

In order for the new settings to take effect, the user should activate the Apply button 369. In effect, the old settings are stored in a location in memory 25 as the effective settings, and the new settings are stored in a different location in memory 25. When the Apply button 369 is activated, the old settings are replaced by the new settings. In an alternative, apparatus 20 should use the new settings, i.e., replacing the old settings with the new settings, when apparatus 20 starts a new search for programs for automatic recording. In yet another alternative, apparatus should periodically moves the new settings to replace the old settings. These alternatives for handling new settings can be applied to all Apply buttons used in other menus described in this specification.

Figure 4:
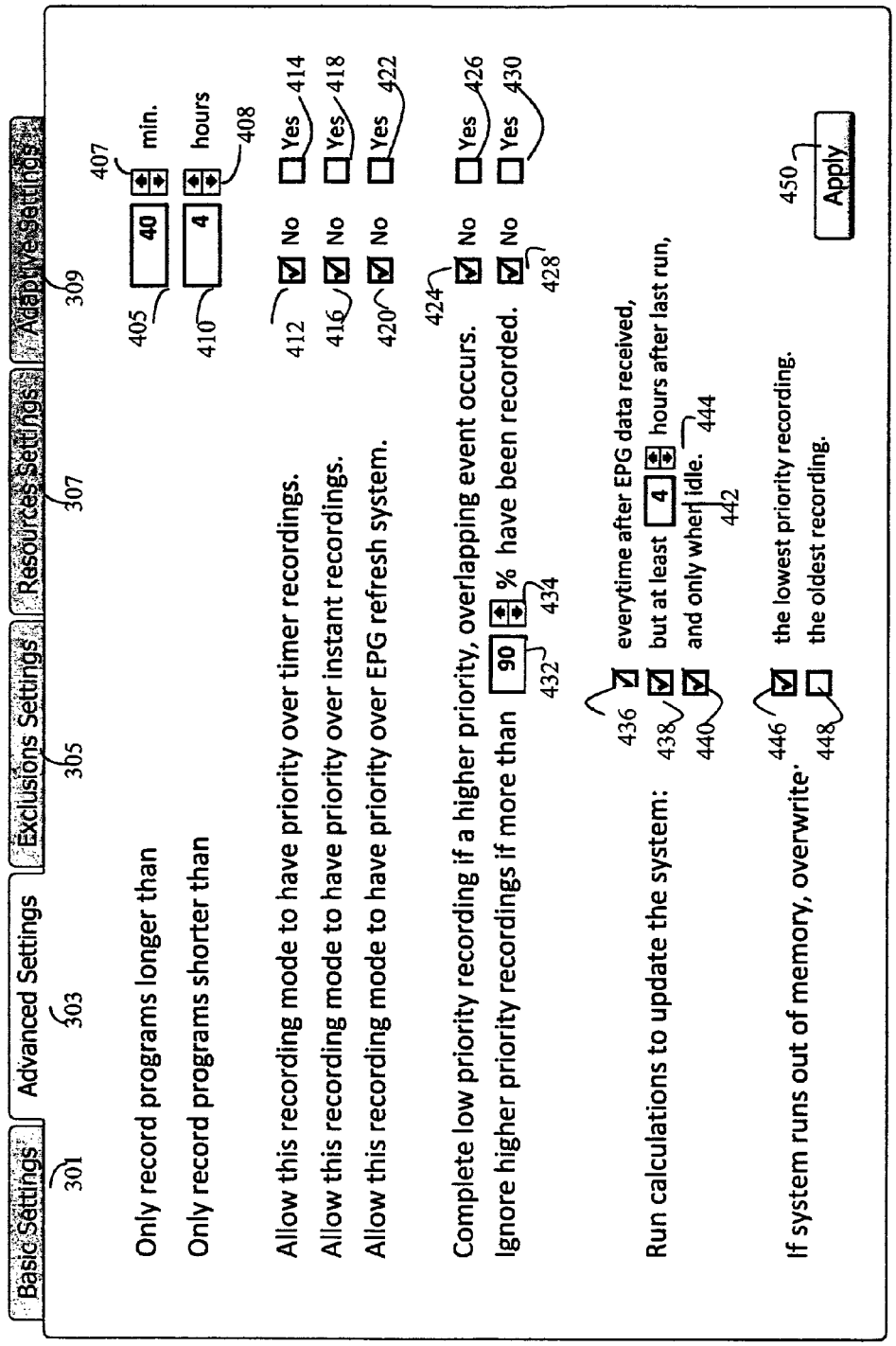
FIG. 4 shows an exemplary set-up menu for a user to enter allowable program lengths, priorities for different recording modes, when system computations should occur, and what programs to remove if running out of memory according to an exemplary embodiment of the present invention.

Referring now to FIG. 4, a setup menu 400 is shown. The menu items 301, 303, 305, 307, and 309 are the same as the setup menu 300. The difference is that in FIG. 4, the user selects Advanced Settings 303. If the user does not set any parameter in the setup menu 400, the apparatus 20 will use the default for each parameter as shown. The menu 400 allows a user to enter allowable program lengths, priorities for different recording modes, when system computations should occur, and what programs to remove if running out of memory.

A number box 405 allows the user to specify a minimum program length for a program to be automatically selected for recording. The user can use arrow buttons 407 to increase and decrease the minimum program length setting. The unit in the example is in "minute" and the system default is 40 minutes. With the default, the apparatus 20 will not record program having length of no greater than 40 minutes.

A number box 410 allows the user to specify a maximum program length for a program to be automatically selected for recording. The user can use arrow buttons 408 to increase and decrease the maximum program length setting. The unit in the example is in "hour" and the system default is four hours. With the default, the apparatus 20 will not record program having length of four hours or longer.

Check boxes 412 and 414 allow the user to specify whether an automatic recording has a higher priority over timer recordings. The system default is No.

Check boxes 416 and 418 allow the user to specify whether an automatic recording has a higher priority over instant recordings. The system default is No.

Check boxes 420 and 422 allow the user to specify whether an automatic recording has a higher priority over the EPG refresh system. The system default is No. The EPG refresh system updates the EPG information stored on the storage such as memory 25 when updated EPG information has been received. When an automatic recording may overlap in time with storing updated EPG, apparatus 20 decides which one has the priority according to this setting.

Check boxes 424 and 426 allow the user to specify whether a lower priority recording should be allowed to complete if a higher priority recording occurs during the recording of a lower priority recording. The system default is No.

Check boxes 428 and 430 allow the user to specify whether a lower priority recording that has completed more than a user specified percentage should be allowed to complete if a higher priority recording occurs during the recording of a lower priority recording. The system default is No. A user can specify the percentage in a number box 432 using adjusting arrow buttons 434. The default percentage is 90%.

Check boxes 436, 438, and 440 allow the user to tell the apparatus 20 when the computations, such as the percentage of recording has been completed, should be performed. When the check box 436 is checked, the computations are performed every time after updated EPG data has been received. When the check box 438 is checked, the computations are performed after a time interval has elapsed from the last performance of the computations. The user may specify the time interval using the number box 442 and adjustment buttons 444. When the check box 440 is checked, the computations are performed when the apparatus 20 becomes idle. It is preferable that the check box 436 is always checked, so that the computations are performed on the update EPG data. The other two check boxes are optional and set forth the additions conditions to be met in order for a new computation to be performed. The default is that all three boxes are checked and the default for the interval at the number box 442 is 4 hours.

Check boxes 446 and 448 allow the user to tell apparatus 20 to take a particular action when the system runs out of memory. If the check box 446 is checked, the apparatus 20 will overwrite the lowest priority recording and if the check box 448 is checked, the apparatus 20 will overwrite the oldest recording.

An Apply button 450 has a similar effect as the Apply button 369 in FIG. 3.

Figure 5:
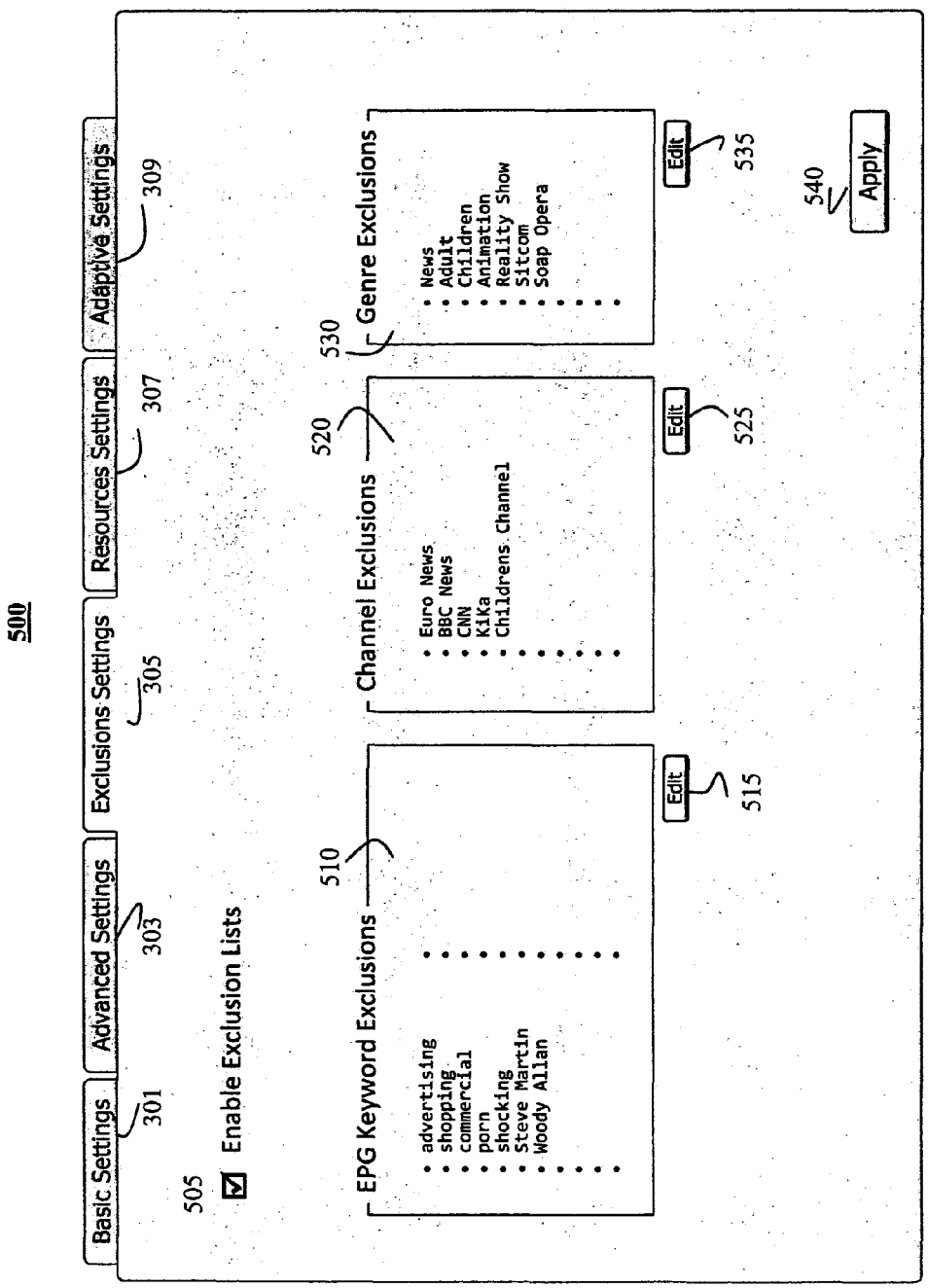
FIG. 5 shows an exemplary set-up menu for a user to enter exclusion keywords, channels, and genres according to an exemplary embodiment of the present invention.

Referring now to FIG. 5, a setup menu 500 is shown. The menu items 301, 303, 305, 307, and 309 are the same as the setup menu 300. The difference is that in FIG. 5, the user selects Exclusions Settings 303. The setup menu 500 allows the user to enter keywords, channel names, and genres, so that if any of the entry is found in program guide information of a program, that program will not be selected for automatic recording even if the program meets the condition for automatic recording. Each entry in each of the three lists 510, 520, and 530 has the same weight or priority. Edit buttons 515, 525, and 535 have the same functions as those shown in FIG. 3, and an Apply button 540 has a similar effect as the Apply button 369 in FIG. 3.

When check box 505 is checked, apparatus 20 will take the exclusions settings into consideration. Otherwise, apparatus 20 will not consider the exclusions settings. The default is to consider the exclusive settings.

Figure 6:
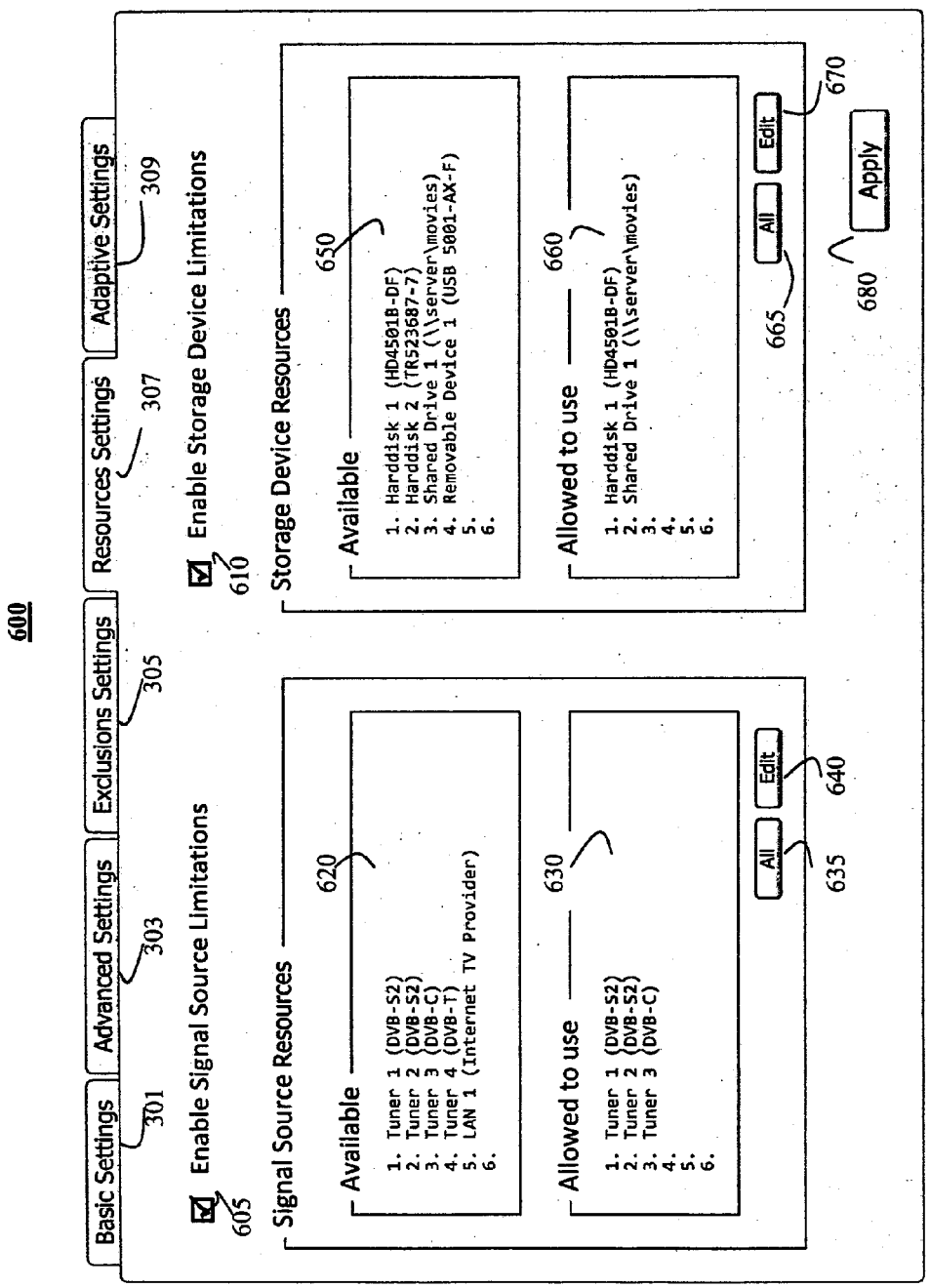
FIG. 6 shows an exemplary set-up menu for a user to specify signal sources and storage devices allowed for use in automatic recording according to an exemplary embodiment of the present invention.

Referring now to FIG. 6, a setup menu 600 is shown. The menu items 301, 303, 305, 307, and 309 are the same as the setup menu 300. The difference is that in FIG. 6, the user selects Resources Settings 307. The menu 600 allows the user to specify signal sources and storage devices allowed for use in automatic recording.

If a check box 605 is checked, apparatus 20 will consider the signal source limitation and if a check box 610 is checked, apparatus 20 will consider the storage device limitation. If they are not checked, apparatus 20 is allowed to record programs from any signal source onto any storage device. Both boxes are checked as a default.

The available signal sources are listed in an available signal source list 620, which is implemented as an information box, and the allowed signal sources are listed in an allowed signal source list 630, which is also implemented as an information box. If the user activate the All button 635, all the available signal sources listed in the available signal source list 620 will appear on the allowed signal source list 630. When the Edit button 640 is activated, a pop-up menu (not shown) should appear and allow the user to select any of the available signal sources to be included in the allowed signal source list 630. For example, in the pop-up menu may include a list of available signal sources on the left and the allowed signal sources on the right, and when a signal source on the available signal source list is highlighted and a button, for example an "OK" button, on the remote is pressed, the highlighted signal source is added to the list of allowed signal sources. Apparatus 20 detects the presence of a signal source in a conventional manner and lists that signal source in the available signal source list 620.

The user interface for the storage device settings includes an available list 650, an allowed list 660, an All button 665 for selecting all listed in the available list and an Edit button 670 for editing the allowed list. Since their functions are similar to the respective functions for the user interface for the signal resource settings, no further details are provided here. Again, apparatus 20 detects presence of a storage device in a conventional manner and lists that storage device in the storage device available list 650.

The function of the Apply button 680 for the settings is similar to the Apply button 369 in FIG. 3.

Figure 7:
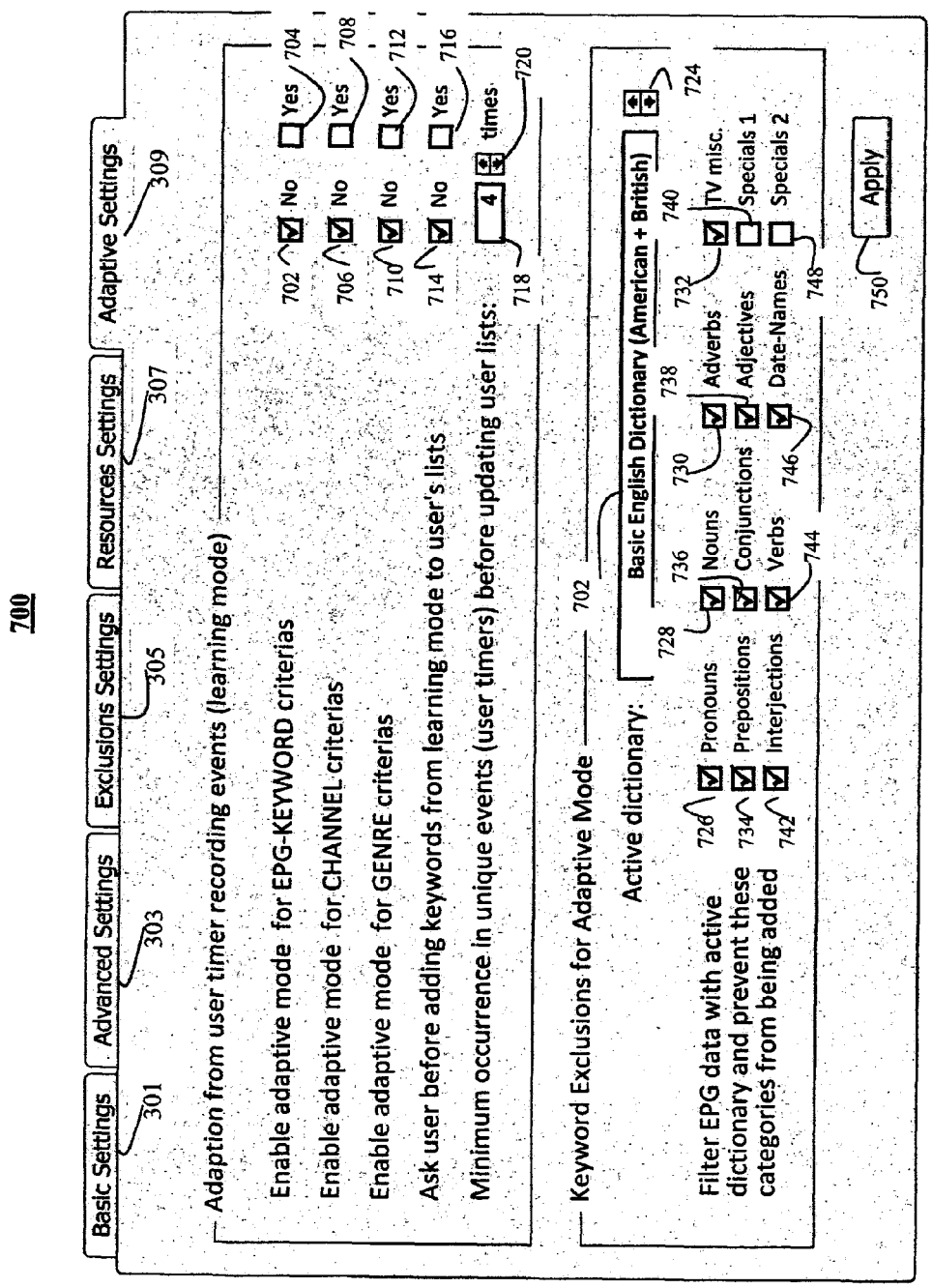
FIG. 7 shows an exemplary set-up menu for a user to specify whether a user wants the apparatus to automatically collect user preference data according to the recording habit of the user and combine the collected data to the user entered data according to an exemplary embodiment of the present invention.

Referring now to FIG. 7, a setup menu 700 is shown. The menu items 301, 303, 305, 307, and 309 are the same as the setup menu 300. The difference is that in FIG. 7, the user selects Adaptive Settings 309. If the user does not set any parameter in the setup menu 400, apparatus 20 will use the default for each parameter as shown. The menu 700 allows the user to specify whether the user wants apparatus 20 to automatically collect the user preference data according to the recording habit of the user and combine the collected data with the user entered data. In effect, if enabled by the user, apparatus 20 is adapted or learned from the characteristics of those programs recorded by the user using a timer (entering date, start time, end time and channel). Apparatus 20 analyzes the program guide information of the timer recorded programs. If a keyword appears in the program information of a predefined number, for example four, of the timer recorded programs and the keyword is not in the keyword list 317 in FIG. 3, apparatus 20 automatically adds the keyword into the keyword list 317 as the first or the last item. Preferably, the automatically generated keyword is added as the last item on the keyword list 317. The predefined number may be specified by the user using the number box 710 and adjusting arrows 720, and the user by using the Edit button 323 can reposition the automatically generated keyword in any position in the keyword list 317.

Similarly, if apparatus 20 finds a predefined number, for example four, of the timer-recorded programs is from a particular channel and that that particular channel name is not in the channel name list 323, apparatus 20 automatically adds that particular channel name into the channel name list 325 either as the first or the last item. Again, the pre-defined number may be specified by the user using the number box 710 and adjusting arrows 720, and by activating the Edit button 331, the user is able to position the particular channel in any position in the channel list 325.

Similarly, if apparatus 20 find a predefined number, for example four, of the timer-recorded programs belongs to a particular genre and that that particular genre is not in the genre list 333, apparatus 20 automatically adds that particular genre into the genre list either as the first or the last item. Again, the pre-defined number may be specified by the user using the number box 710 and adjusting arrows 720, and by activating the Edit button 331, the user is able to position the particular channel in any position in the genre list 333.

In an alternative, apparatus 20 may add a new entry to the corresponding list according to the number of timer-recorded programs that the entry appears. For example, if the entry appears in four timer recorder program, apparatus 20 adds the entry to the last of the corresponding list. If the entry appears in eight timer recorder program, apparatus 20 adds the entry to the middle of the list, and if the entry appears in more than eight timer recorded programs, apparatus 20 adds the entry to the top of the corresponding list.

To distinguish between user entered entries and automatically entered entries, apparatus 20 may indicate those automatically entered entries by prepending/appending a special symbol, such as asterisk, to each automatically entered entry.

Check boxes 702 and 704 allow the user to specify whether the user wants apparatus 20 to automatically collect and enter keywords, check boxes 706 and 708 allow the user to specify whether the user wants apparatus 20 to automatically collect and enter channel names, and check boxes 710 and 712 allow the user to specify whether the user wants apparatus 20 to automatically collect and enter genres. Check boxes 714 and 716 allow the user to specify whether apparatus 20 should seek approval from the user before adding any automatically generated item into any list.

However, there are a lot of words that are fundamental to the language but are not helpful for identifying a program. There words should be excluded. These words include pronouns such as "it," "you," "she," and "I," and their respective object and possessive forms; prepositions such as "for," "and," "or," "nor," "but," "yet," and "so;" prepositions such as "for," "by," "like," "despite," "since," "of," and "off;" interjections, nouns such as "door," "program," and "information;" verbs such as "go;" adverbs such as "slowly;" adjectives such as "beautiful;" date names; and some TV miscellaneous and special terms as specified by a user. These words should be stored in a storage (such as memory 25) accessible by apparatus 20 as a dictionary, and apparatus 20 should allow the user to add or delete a word for a category through, for example, a GUI (not shown). The system may have more than one stored dictionary. For example, apparatus 20 may have one dictionary for American English and the other for British English and the user may select which dictionary to be used using the text box 722 and the adjustment arrows 724.

Boxes 726-748 allow the users to specify which categories of words in the selected dictionary should be excluded by apparatus 20 as automatically generated entries to any of the lists.

An Apply button 750 has a similar effect as the Apply button 369 in FIG. 3.

Figure 8:
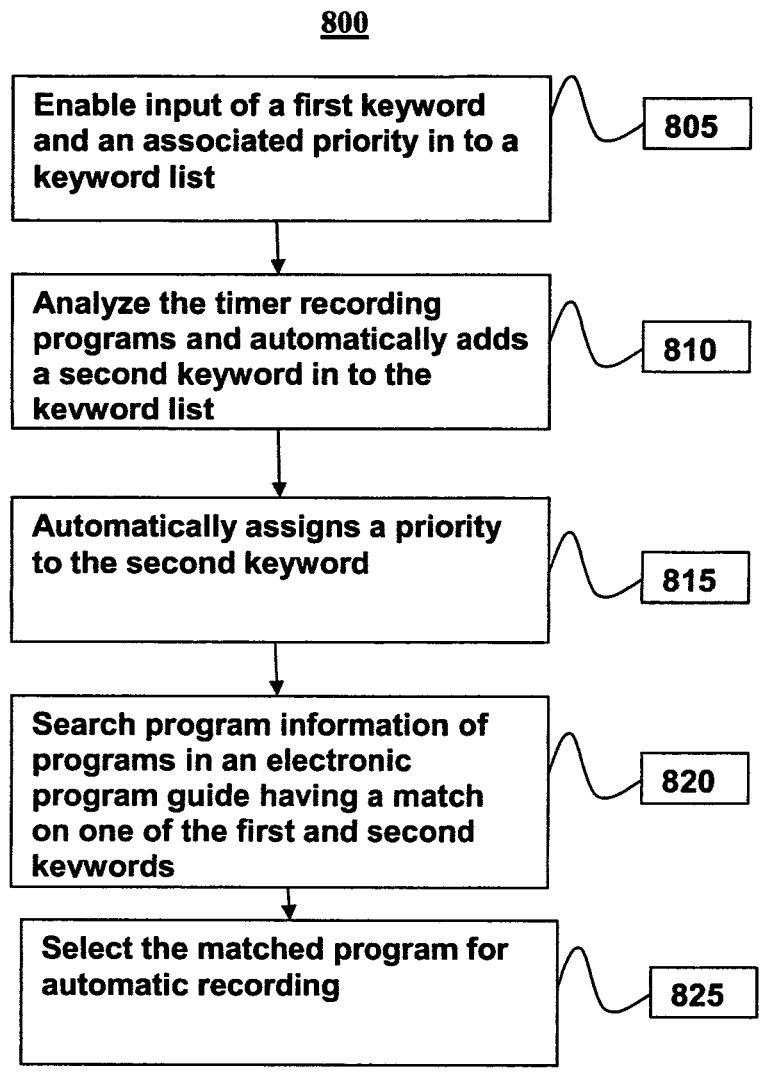
FIG. 8 shows a flow diagram for automatic recording according to an exemplary embodiment of the present invention.

Although FIG. 3 show settings for keywords, channels, and genres, apparatus 20 can use just one category for selecting programs for automatic recording according to the principles of the invention. For example, FIG. 8 shows that the keyword settings are used for searching and selecting programs for automatic recording. Although keyword settings are used as an example, channel and genre settings can be used in a similar manner. For simplicity, the same steps will not be repeated for channels and genres.

At step 805, apparatus 20 enables a user to enter a first keyword and the associated priority into the keyword list 317 in FIG. 3 using the Edit button 323. As discussed above, the priority of a keyword in the keyword list may depend on the position of that keyword in the list. If the user has selected that each keyword has the same weight, all keywords would have the same priority.

At step 810, apparatus 20 analyzes the recording habit of the user by analyzing the program information of timer recorded programs, i.e., the manually recorded programs, and automatically enter a second keyword according to the analysis. This assumes that apparatus 20 is enabled to use the adaptive mode for keyword entries, as shown in FIG. 7. As discussed above, if a keyword appears in a predefined number, such as 4, of timer recorded programs, apparatus 20 adds that keyword to the keyword list 317.

At step 815, apparatus 20 also assigns a priority to the second keyword. As discussed above, the priority in this example may correspond to the position of the second keyword in the keyword list 317 or all keywords may have the same priority. Apparatus 20 may add the second keyword as the first or last item in the keyword list. Apparatus 20 may also add the second keyword to a position according to the number of timer recorded programs that the second keyword appears.

At step 820, apparatus 20 searches program information of programs in an electronic program guide stored in a memory having a match on one of the first and second keywords. At step 830, apparatus 20 selects those matched programs for automatic recording.

The user may enter an exclusion list using the menu 500 as shown in FIG. 5. If the program information of a matched program includes any entry in any exclusion list, the matched program is not selected for automatic recording.

The user may use the Edit button 323 to change the priorities of the first and second keywords, even if the second keyword is automatically added by apparatus 20.

Apparatus 20 may compute a final score for each matched program according to the priorities associated with the first and second keywords. For example, if the position of a keyword represents the priority of a keyword and the first and second keywords are listed as numbers 1 and 2 respectively, the first and second keywords are assigned 2 and 1, respectively, as priority factors. Essentially, the keyword listed earlier is assigned a higher priority factor (weight). If there are N items in the list, the first item is assigned the priority factor of N and each following item is assigned a priority factor, which is one less the priority factor of the item listed immediately above it. In the illustration, for a matched program, if the program information of a matched program includes a keyword, it is assigned a score of the associated priority factor of that keyword and 0 if the program information does not include that keyword. In the example above, if the program information of a matched program includes the first keyword, it is assigned a score of 2 and if the program information does not include the first keyword, it is assigned a score of 0. Furthermore, if the program information includes the second keyword, it is assigned a score of 1 and if the program information does not include the first keyword, it is assigned a score of 0. The final score for each matched program is the sum of the two scores. In this embodiment, the final score is normalized by dividing the sum by the sum of the two assigned priority factors. The division result is then multiplied by 100 to convert the final result into the unit of percentage. For example, if the program information of a matched program includes both the first and second keywords, the final score is 100%, if only the first keyword, 66.7%, and if only the second keyword, 33.3%. The final score is then compared to the threshold entered by the user at number box 313 in FIG. 3. If it is over the threshold, the program is selected for automatic recording and if it is less than the threshold, the program is not selected for automatic recording.

The category ratings 343, 345, and 347 are not used, because in this embodiment, only the keyword category is used to search and select programs for automatic recording.

The user can use the set-up menu 600 to specify the allowable signal sources and storage devices for automatic recording.

Figure 9:
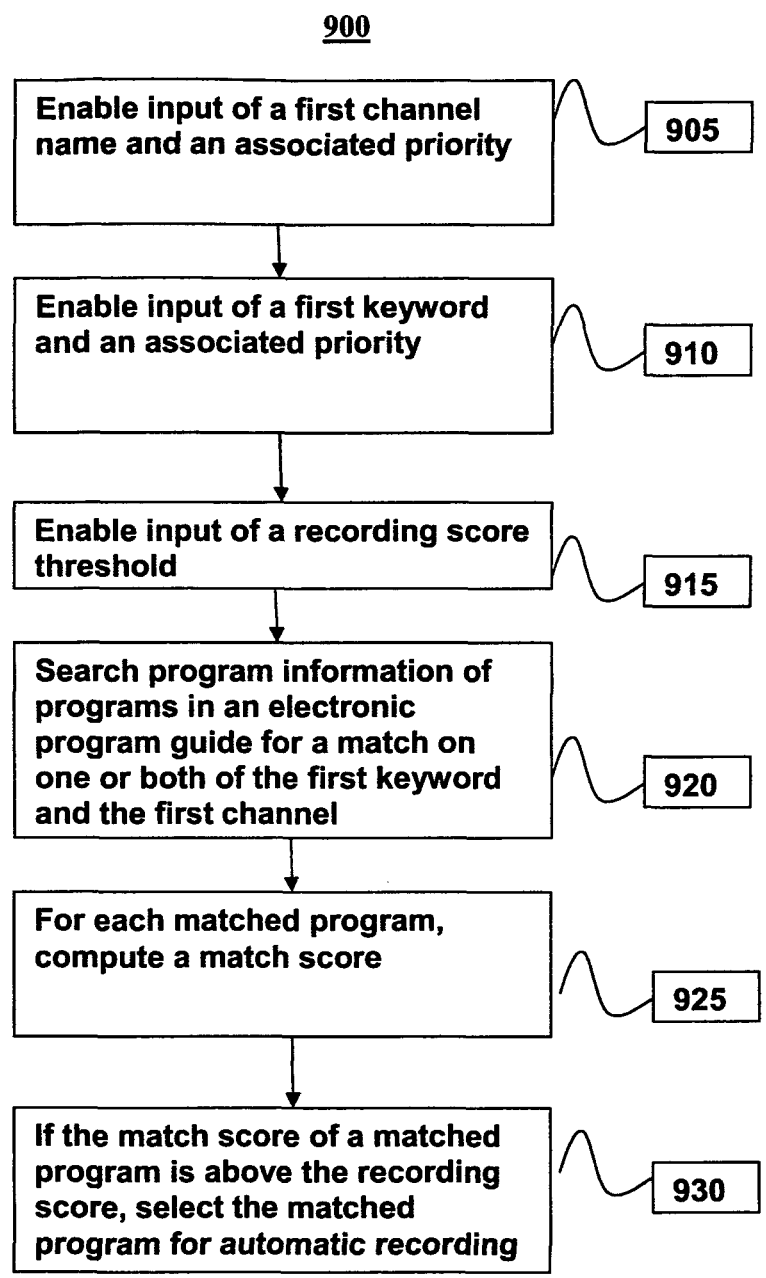
FIG. 9 shows a flow diagram for automatic recording according to another exemplary embodiment of the present invention.

According to the principles of the invention, apparatus 20 can use any two of the three categories for searching and selecting programs for automatic recording. FIG. 9 shows the process of selecting a program for recording using only the keyword and channel categories. The same process can be applied to other combinations.

At step 905, apparatus 20 enables input of a first channel and an associated priority and at step 910, apparatus 20 enables input of a first keyword and an associated priority. Apparatus 20 may display menu 300 in FIG. 3 for a user to enter the first keyword and the associated priority into the keyword list 317 in FIG. 3 and the first channel and associated priority into channel name list 325 in FIG. 3. At step 915, apparatus 20 enables input of m recording score threshold. A user may enter the recording score threshold at the number box 313 in FIG. 3.

At step 920, apparatus 20 searches program information of programs in the EPG for a match to one or both of the first channel and the first keyword. At step 925, for each matched program, apparatus computes a match score. A matched program is a program having program information includes one of the first channel and the first keyword. In computing the score, apparatus 20 assigns a priority factor for each keyword according to the position of the position in the keyword list 317. For example, if there are N keywords in the keyword list, the keyword listed in the first position is assigned a priority factor of N. A keyword is assigned a priority factor one less than the priority factor of the keyword immediately listed before it. If the priority of each keyword is the same, all keywords on the list are assigned a priority factor of 1. Apparatus 20 computes a normalized score for the keyword category by dividing the sum of the priory factors of all the matched keywords by the sum of the priority factors for all keywords in the list. In this example, since there is only one keyword in the keyword list, if there is a match to the first keyword, the normalized score for the keyword category is one and if there is no match to the first keyword, the normalized score for the keyword category is 0.

Apparatus 20 computes a normalized score for the channel category in a similar manner. In this example, if there is a match to the first channel number, the normalized score for the channel category is 1 and if no match, the normalized score for the channel category is 0.

Apparatus 20 may then compute a matched score of a matched program by multiplying the corresponding normalized score in the keyword category by the corresponding normalized score in the channel category. In this embodiment, the priorities of the keyword and channel categories are treated the same. In another embodiment where the priorities of these two categories are treated the same, apparatus 20 may add the corresponding to normalized scored and divide the sum by 2 to obtain the match score for a program.

In yet another embodiment, a user may enter different priorities for different categories. For example, using the setup menu 300, the priority for the keyword category may be specified as high, while the priority for the channel is specified as medium. Apparatus 20 may assign weighing factors for the high and medium priorities. For example, apparatus 20 may assign weighing factors of 5 and 3 to the high and medium categories, respectively. Apparatus 20 may then compute a match score for a matched program by first multiplying the normalized scores with respective categories weighing factors, adding the two mortification results, and dividing the sum by the sum of the two weighing factors to obtain the match score.

The match score may be multiplied by a factor of 100 to be in the unit of percentage. At step 930, apparatus 20 then compares the match score of a matched program with a recording score threshold and if the match score is over the threshold, apparatus 20 selects that matched program for automatic recording. Otherwise, the matched program is not selected for automatic recording. The threshold may be entered by a user via the number box 313 in FIG. 3.

Similar to the embodiment shown in FIG. 8, apparatus 20 may take the exclusion lists, resource settings, and adaptive settings into account in the embodiment shown in FIG. 9. The algorithm shown in FIG. 9 can be extended to cases where all three categories are considered.

Figure 10:
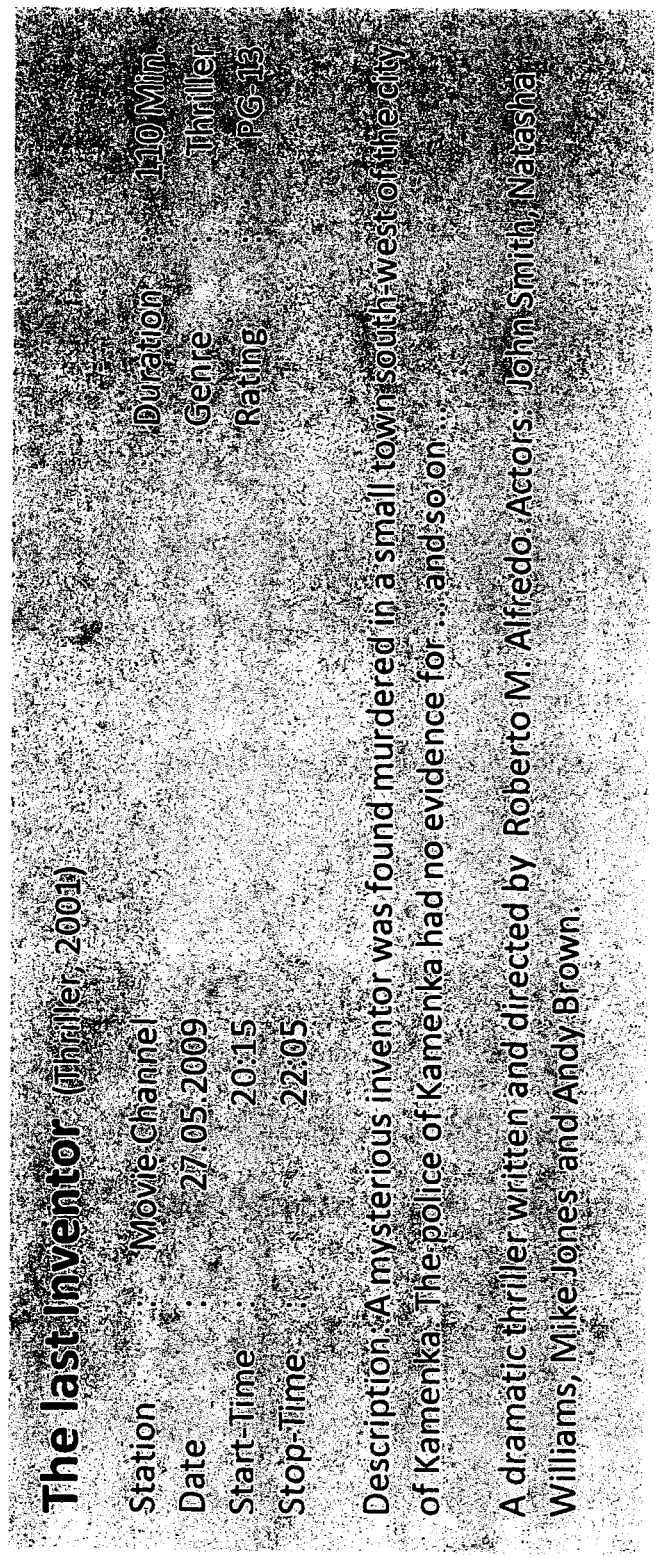
FIG. 10 shows exemplary program information of a program in an electronic program guide.

FIGS. 10-12 provide an example of how to compute a match score when all three categories are used. FIG. 10 shows an exemplary program information of a program entitled "The Last Inventor" in an electronic program guide. The program information includes information about the channel name, program time, program duration, the genre, the rating, a brief description of the program, and other information, such as, actors. In FIG. 11, the column 1101 lists those words that are found in the program information but are not considered by apparatus 20 according to the dictionary stored in apparatus 20, the column 1110 lists those words in the program information, which are not on the keyword list 317 in FIG. 1, and the column 1120 lists that words in the program information, which are listed in the keyword list 317 in FIG. 3. In this example, we assume that only the first seven keywords are listed in the keyword list 317. As shown in the column 1120, apparatus 20 finds that there are two matched keywords: "Thriller" and "John Smith."

Referring to FIG. 12(a), it shows a table 1210 for computing a normalized score for the keyword category. As shown in columns 1212 and 1214, apparatus 20 detects that "Thriller" and "John Smith" are the two matched keywords. Assume that the keyword list includes only the seven keywords shown in column 1212 and apparatus 20 assigns a first number called a priority factor for each keyword in the keyword list according to the position of a keyword in the list. In this example, since there are seven in the list, the keyword listed in the first position will be assigned a priority factor of 7. A keyword is assigned a priority factor one less than the priority factor of the keyword immediately listed before it. Apparatus 20 computes the sum of the priority factors of all the seven keywords as 28. Column 1218 shows the scores earned by the keyword category. Apparatus 20 adds the priority factors of the matched keywords to obtain a score for the keyword category. In this example, the score is 12. The score is then normalized by dividing the score, 12, with the sum of the priority factors, 28. The normalized score for the keyword category is 0.43 in this example.

It should be noted that if keywords in the keyword list are treated with the same priority, the priority factor for each keyword is assigned to 1.

Referring to FIG. 12(b), it shows a table 1240 for computing a normalized score for the channel category. As shown in columns 1242 and 1244, apparatus 20 detects that the Movie Channel is the matched channel. Assume that the channel list includes only the five channels shown in column 1242 and apparatus 20 assigns a priority factor for each channel in the channel list according to the position of a channel name in the list. In this example, since there are five in the list, the channel listed in the first position will be assigned a priority factor of 5. A channel is assigned a priority factor one less than the priority factor of the channel immediately listed before it. Apparatus 20 computes the sum of the priority factors of all the five channels as 15. Column 1248 shows the scores earned by the channel category.

Apparatus 20 adds the priority factors of the matched channels to obtain a score for the channel category. In this example, the score is 4. The score is then normalized by dividing the score, 4, with the sum of the priority factors, 15. The normalized score for the channel category is 0.27 in this example.

It should be noted that if channels in the channel name list are treated with the same priority, the priority factor for each channel is assigned as 1.

Referring to FIG. 12(c), it shows a table 1270 for computing a normalized score for the genre category. As shown in columns 1272 and 1244, apparatus 20 detects that the thriller genre is the matched genre. Assume that the genre list includes only the four genres shown in column 1272 and apparatus 20 assigns a priority factor for each genre in the genre list according to the position of a genre in the list. In this example, since there are four in the list, the genre listed in the first position will be assigned a priority factor of 4. A genre is assigned a priority factor one less than the priority factor of the genre immediately listed before it. Apparatus 20 computes the sum of the priority factors of all the four genres as 10. Column 1278 shows the scores earned by the channel category. Apparatus 20 adds the priority factors of the matched genres to obtain a score for the genre category. In this example, the score is 3. The score is then normalized by dividing the score, 3, with the sum of the priority factors, 10. The normalized score for the genre category is 0.30 in this example.

It should be noted that if genres in the genre list are treated with the same priority, the priority factor for each genre is assigned as 1.

The final score is computed according to numbers shown in table 1300 in FIG. 13. Column 1320 shows the normalized scores for categories listed in column 1310. Those normalized scores are computed in FIG. 12. As shown in FIG. 12, the keyword, channel, and genre categories are assigned category priorities high, medium, and low, respectively. In this example, high, medium, and low priorities are assigned a weighing factors of 5, 3, and 1, respectively. As such, column 1330 shows that the keyword, channel, and genre categories are assigned weighing factors of 5, 3, and 1, respectively. Apparatus 20 compute the sum of weighing factors as 9. Apparatus 20 also computes a second number called weighted score for each category, as shown in column 1340, by multiplying the normalized score of a category with the weighing factor assigned to that category. Apparatus 20 computes the sum of 3.26 for the weighted scores shown in column 1340. A final score is computed by dividing the sum of the weighted scores by the sum of the weighing factors, i.e., 3.26/9. In this example, the final score is 0.36, which is above the threshold of 0.25. As such, apparatus 20 will select this program for automatic recording. The threshold may be entered by a user, via, decision threshold number box 313 in FIG. 3.

If the priorities for the three categories are treated the same, the final score can be obtained by multiplying the three normalized scores, or by adding the three normalized scores and dividing the sum by 3.

The final score may be multiplied by 100 to be in the unit of percentage, so that a user can more conveniently enter the decision-threshold 313 in FIG. 3.

When a program has been selected for automatic recording, apparatus 20 may display an OSD informing the user of the fact.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for searching a program for automatic recording, said method comprising steps of:
    enabling input of a first entry and an associated first priority from a user, wherein said first entry is one of following categories: keyword, channel, and genre;
    automatically entering by a television receiver, a second entry in said one category according to a recording habit of said user;
    automatically assigning by said television receiver, a second priority to said second entry;
    searching program information of programs in an electronic program guide having a match on one of said first and second entries;
    selecting a matched program for said automatic recording; and
    for said automatic recording, enabling said user to specify whether a lower priority recording should be allowed to completed if a higher priority recording occurs during said automatic recording of said lower priority recording.

2. The method of claim 1, further comprising steps of:
    enabling input of entries to an exclusion list;
    if said matched program having program information includes any one of said entries in said exclusion list, said selecting step does not select said matched program.

3. The method of claim 1, further comprising enabling said user to change said first and second priorities.

4. The method of claim 1, wherein said automatically assigning step assigns said second priority to be different from said first priority.

5. The method of claim 2, further comprising enabling said user to specify in said exclusion list which categories of words in a selected dictionary should be excluded.

6. The method of claim 5, wherein said second priority is higher than said first priority.

7. The method of claim 1, further comprising for each matched program, computing a final score according to said first and second priorities.

8. The method of claim 7, wherein said computing further comprises:
    assigning first and second numbers according to said first and second priorities, respectively;
    assigning first and second scores as said first and second numbers if there is match to said first and second keywords, respectively, and as zero if no match to said first and second keywords, respectively; and
    combining said first and second scores to produce said final score.

9. The method of claim 8, wherein said combining further comprises:
    adding said first and second numbers to form a third number;
    adding said first and second scores to form a fourth number; and
    dividing said fourth number by said third number to form said final score.

10. The method of claim 9, further comprising if said final score of said matched program is greater than a threshold, selecting said matched program for automatic recording.

11. The method of claim 10, further comprising enabling said user to enter said threshold.

12. The method of claim 1, further comprising enabling selection of signal sources for said automatic recording, wherein said selecting selects matched programs only from one of said signal sources.

13. The method of claim 1, further comprising enabling selection of storage devices and recording said matched program to one of said storage devices.

14. The method of claim 1, further comprising marking said second keyword indicating that said second entry is entered by said television receiver.

15. An apparatus comprising:
    an input receiving a first entry and associated first priority from a user, wherein said first entry is one of following categories: keyword, channel, and genre;
    a processor entering a second entry in said one category according to a recording habit of said user, automatically assigning a second priority to said second entry; and receiving said first entry and said first priority from said input;
    a memory storing an electronic program guide, and said first and second entries and priorities, wherein said processor searches program information of programs in said electronic program guide having a match on one of said first and second entries and selects a matched program for automatic recording, and said processor enables said user to specify whether a lower priority recording that has completed more than a user specified percentage should be allowed to be completed if a higher priority recording occurs during said automatic recording of said lower priority recording.

16. The apparatus of claim 15, wherein said processor receives from said input entries to an exclusion list, and if said matched program having program information includes any one of said entries in said exclusion list, said processor does not select said matched program.

17. The apparatus of claim 15, wherein said processor enables said user to change said first and second priorities.

18. The apparatus of claim 17, wherein said second priority is different than said first priority.

19. The apparatus of claim 16, wherein said processor enables said user to specify in said exclusion list which categories of words in a selected dictionary should be excluded.

20. The apparatus of claim 15, wherein said processor computes a final score according to said first and second priorities.

21. The apparatus of claim 20, wherein said processor computes said final score by assigning first and second numbers according to said first and second priorities, respectively, assigning first and second scores as said first and second numbers if there is match to said first and second entries, respectively, and as zero if no match to said first and second entries, respectively, and combining said first and second scores to produce said final score.

22. The apparatus of claim 21, wherein said processor combines said first and second scores to produce said final score by adding said first and second numbers to form a third number, adding said first and second scores to form a fourth number, dividing said fourth number by said third number to form said final score.

23. The apparatus of claim 22, wherein said processor selects said matched program for automatic recording of if said final score of said matched program is greater than a threshold.

24. The apparatus of claim 23, wherein said processor receives said threshold from said input.

25. The apparatus of claim 15, wherein said processor receives selection of a signal source and selects matched programs only from said signal source.

26. The apparatus of claim 15, wherein said processor receives selection of a storage device and records said matched program only to said storage device.

* * * * *